(12) United States Patent
Takahata et al.

(10) Patent No.: US 6,272,278 B1
(45) Date of Patent: Aug. 7, 2001

(54) VIDEO DATA STORAGE AND PLAYBACK SCHEME WITH AUTOMATIC PLAYBACK CONTINUATION AFTER OVERTAKING

(75) Inventors: Minoru Takahata; Kazutoshi Nishimura, both of Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 09/201,109

(22) Filed: Nov. 30, 1998

(51) Int. Cl.[7] .................................................. H04N 5/91
(52) U.S. Cl. ............................ 386/46; 386/125; 386/109; 386/68
(58) Field of Search ..................................... 386/125–126, 386/68, 70, 46, 109, 112; 360/7; 369/60, 32; H04N 5/91

(56) References Cited

U.S. PATENT DOCUMENTS

| | | | |
|---|---|---|---|
| 4,206,476 | * | 6/1980 | Hashimoto ............................ 360/32 |
| 5,134,499 | * | 7/1992 | Sata et al. ............................ 386/109 |
| 5,241,428 | * | 8/1993 | Goldwasser et al. ................ 386/109 |
| 5,371,551 | * | 12/1994 | Logan et al. ......................... 386/112 |
| 5,436,875 | * | 7/1995 | Shinada ................................. 369/32 |
| 5,438,423 | * | 8/1995 | Lynch et al. ......................... 386/109 |
| 5,745,639 | * | 4/1998 | Gensheimer ......................... 386/125 |
| 5,930,444 | * | 7/1999 | Camhi et al. ......................... 386/46 |
| 6,081,612 | * | 1/2000 | Thomason et al. .................... 386/82 |

FOREIGN PATENT DOCUMENTS

| | | | | |
|---|---|---|---|---|
| 0544299 A2 | * | 6/1993 | (EP) .............................. G11B/20/10 |
| 0866446 A2 | * | 9/1998 | (EP) ................................ G11B/7/00 |
| 06245157 | | 9/1994 | (JP) . | |
| WO 9633579 | * | 10/1996 | (WO) ............................. H04N/9/804 |

* cited by examiner

Primary Examiner—Wendy R. Garber
Assistant Examiner—Vincent F. Boccio
(74) Attorney, Agent, or Firm—Olson & Hierl, Ltd.

(57) ABSTRACT

A video data storage and playback scheme in which the playback of video data that has been interrupted due to the occurrence of the overtaking at the storage device can be automatically resumed at the playback device is disclosed. The storage device is controlled to transmit the read out video data to the playback device by attaching control data indicating that it is video data read out after an overtaking occurred, when the read out video data is video data stored after an occurrence of the overtaking in which a reading position of video data in a process of being read out from the storage device in response to the request from the playback device overtook a writing position of video data in a process of being written into the storage device. Then, the playback device is controlled to resume playback of video data that has been interrupted due to the occurrence of the overtaking, upon detecting the control data.

16 Claims, 6 Drawing Sheets

VIDEO DATA STORAGE AND PLAYBACK SCHEME WITH AUTOMATIC PLAYBACK CONTINUATION AFTER OVERTAKING

BACKGROUND OF THE INVENTION

1. Field of the Invention

The present invention relates to a video data storage and playback system in which video data stored at a storage device are transmitted to and playbacked at a playback device. Note that, in the following description, a term "overtaking" is used to indicate a situation in which the video data reading operation catches up with (but not passing) the video data writing operation.

2. Description of the Background Art

FIG. 5 shows a schematic configuration of a conventional video data storage and playback system, which generally comprises a storage device 1 and a playback device 2.

The storage device 1 further comprises a writing control unit 3, a memory unit 4, a writing position information register unit 5, and a reading control unit 6. This storage device 1 can be provided in a form of a video server in which digital video data under the writing processing can also be read out, for example, in which case the writing control unit 3 is formed by a network interface board and a control program provided in a computer.

Also, the memory unit 4 can be formed by an SCSI (Small Computer System Interface) board and a hard disk device provided in a computer, or by an IDE (Integrated Drive Electronics) controller and an optical disk device provided in a computer. The writing position information register unit 5 is formed on a main memory in a computer, while the reading control unit 6 is formed by a network interface board and a control program provided in a computer. The writing control unit 3 and the reading control unit 6 often shares the common network interface board.

The playback device 2 further comprises playback control buttons 7, a playback control unit 8, a decoding unit 9, a display unit 10 and a speaker 11.

This playback device 2 can be provided in a form of a video-on-demand terminal, for example, in which case the playback control buttons 7 are provided by a GUI (Graphical User Interface) displayed on the display unit 10.

Also, the playback control unit 8 is formed by a network interface board and a control program provided in a PC, while the decoding unit 9 can be formed by a network interface board and an MPEG (Moving Picture Experts Group) hardware decoder provided in an PC, or by an MPEG software decoder and the like. The playback control unit 8 and the decoding unit 9 often share the common network interface board.

Note that, in FIG. 5, each connection line with arrowhead indicates a route of video data (which will be referred to as a data line hereinbelow), where the direction of arrowhead indicates its transmission direction. The video data are transmitted through networks. Also, in FIG. 5, each connection line without arrowhead indicates a route of control information (which will be referred to as a control line hereinbelow), which is transmitted bidirectionally. In the case where the common network interface board is shared by the writing control unit 3 and the reading control unit 6, or by the playback control unit 8 and the decoding unit 9, the data lines and the control lines are often distinguished logically while using the same physical layer.

Now, a control method in the conventional video data storage and playback system of FIG. 5 in the case where the playback chases after the video data under the writing processing will be described.

FIG. 6 shows a flow chart for the processing procedure by the storage device 1 of FIG. 5, while FIG. 7 shows a flow chart for the processing procedure by the playback device 2 of FIG. 5.

First, a user clicks a fast forward button (or a playback button) among the playback control buttons 7 displayed on the display unit 10 of the playback device 2 using a mouse.

Then, when the chasing playback control processing of FIG. 7 begins upon detecting this operation (step 210), the playback control unit 8 of the playback device 2 commands the reading processing to the reading control unit 6 by specifying a reading mode selected by the user (step 211), and starts the video data reception and the playback processing in the specified mode (step S212).

Thereafter, the playback control unit 8 checks whether an overtaking notice from the reading control unit 6 of the storage device 1 is received or not (step S213). Here, the overtaking occurs when the video data reading is carried out faster than the video data writing at the storage device 1. This overtaking often occurs when video data are to be playbacked in the fast forward mode at the playback device 2, or when a rate of decoding at the decoding unit 9 of the playback device 2 is higher than a rate of receiving video data from the external at the storage device 1 even in the case of playbacking video data in the normal speed at the playback device 2. Besides these, the overtaking also occurs when the video data writing is temporarily stopped for some reason such as a temporal interruption of the video data that have been inputted into the writing control unit 3.

At the storage device 1, the writing control unit 3 receives video data transmitted from the external and writes them into the memory unit 4 sequentially, while registering a position information of each writing completed video data among a series of video data into the writing position information register unit 5.

Then, in parallel to the above operation, when the chasing playback control processing of FIG. 6 begins upon receiving a reading command from the playback device 2 (step 200), the reading control unit 6 starts the processing for reading from the memory unit 4 in the specified mode and transmitting the read out video data to the decoding unit 9 of the playback device 2 (step 201).

Thereafter, the reading control unit 6 reads out the position information of each writing completed video data from the writing position information register unit 5, and checks whether the video data to be read out exists in the memory unit 4 or not, that is, whether the overtaking has occurred or not (step 202). If no overtaking has occurred the video data reading and transmission processing is continued.

At the playback device 2, the decoding unit 9 decodes the received video data, and transmits video image data to the display unit 10 and audio data to the speaker 11. Then, the display unit 10 displays the received video image data. In the case of the playback in the fast forward mode, it is customary to playback no audio data.

On the other hand, when the overtaking occurs, as shown in FIG. 6, the reading control unit 6 of the storage device 1 stops the reading processing (step 203), and notifies the occurrence of the overtaking to the playback control unit 8 of the playback device (step 204). Then, this chasing playback control processing of FIG. 6 is terminated (step 220).

Also, when the overtaking notice is received at the step 213, the playback control unit 8 of the playback device 2 controls the decoding unit 9 such that the decoding unit 9 playbacks the video data remaining in buffer memories within the reading control unit 6 and the decoding unit 9 and then pauses (step 214), and sets only a pause button among the playback control buttons 7 in an operable state (step 230). Then, this chasing playback control processing of FIG. 7 is terminated (step 240).

Also, when the overtaking occurs, in order to continue the playback of the video data automatically without terminating the chasing playback control processing, the following operation sequence may be considered.

Namely, after the overtaking occurs, the playback control unit 8 receives a video data reading interruption notice attached with indicating the occurrence of the overtaking and a playback position information indicating a playback position at which the overtaking occurred, through the control line from the reading control unit 6, and then controls the decoding unit 9 such that the decoding unit 9 playbacks all the video data remaining in buffer memories within the reading control unit 6 and the decoding unit 9 so as to vacate the both buffer memories. Then, the playback control unit 8 transmits a request for reading in the ordinary playback mode starting from a position next to the playback position at which the overtaking occurred that has been notified earlier, through the control line to the reading control unit 6. Then, the playback control unit 8 receives a reading request acknowledgement through the control line from the reading control unit 6. When this received reading request acknowledgement indicates OK, the playback control unit 8 is set in a data waiting state, and the decoding unit 9 resumes receiving of the video data through the data line from the reading control unit 6. When the received reading request acknowledgement indicates NG, the playback control unit 8 waits for awhile and then again transmits a request for reading in the ordinary playback mode from a position next to the playback position at which the overtaking occurred that has been notified earlier, through the control line to the reading control unit 6.

As described above, in the conventional video data storage and playback system of FIG. 5, when the overtaking occurs, the storage device transmits the overtaking notice to the playback device 2 such that the playback device 2 makes a transition to the pause state upon receiving this overtaking notice from the storage device 1.

For this reason, there has been a problem that, in order to playback the video data after the overtaking occurs, the user of the playback device 2 is forced to carry out tedious operations of waiting for awhile and then trying to click the playback button with the mouse.

On the other hand, in the above described operation sequence for continuing the playback of the video data automatically without terminating the chasing playback control processing when the overtaking occurs, the video data on the buffer memories are eliminated once by playbacking all the video data remaining in buffer memories within the reading control unit 6 and the decoding unit 9 so as to vacate the both buffer memories, rather than leaving the video data on the buffer memories and treating them continuously with the video data of the resumed playback after the overtaking. This is because it has been difficult for the playback control unit 8 to comprehend the exact timing of the video data from which the resumed playback after the overtaking in the ordinary mode should be carried out, and realize the continuous playback by accurately aligning the display of the video data on the buffer memory in the decoding unit 9 by the display unit 10 and the playback mode dependent state of the playback control buttons 7. Note that this is the problem caused by the fact that the logically distinguished data lines and control lines are not necessarily synchronized with each other because of the delay through the communication channels or the particulars of the communication control scheme. For example, when the information indicating the occurrence of the overtaking arrives through the control line with a considerable delay compared with the data transmitted through the data line, the continuous playback becomes impossible because the next reading request cannot be transmitted at appropriate timing. When there is a considerable delay until it becomes possible to resume the playback after the overtaking, there can be a state of having no video data to be displayed and in such a state the video display can be interrupted and the entirely black display may be presented depending on types of the decoder 9 and the display unit 10, so as to damage the video display continuity.

SUMMARY OF THE INVENTION

It is therefore an object of the present invention to provide a video data storage and playback system in which the playback of video data that has been interrupted due to the occurrence of the overtaking at the storage device can be automatically resumed at the playback device.

According to one aspect of the present invention there is provided a method for controlling a video data storage and playback system having a playback device for playbacking digital video data and a storage device for storing video data and reading stored video data and transmitting read out video data to the playback device in response to a request from the playback device, the method comprising the steps of: (a) controlling the storage device to transmit the read out video data to the playback device by attaching control data indicating that it is video data read out after an overtaking occurred, when the read out video data is video data stored after an occurrence of the overtaking in which a reading position of video data in a process of being read out from the storage device in response to the request from the playback device overtook a writing position of video data in a process of being written into the storage device; and (b) controlling the playback device to resume playback of video data that has been interrupted due to the occurrence of the overtaking, upon detecting the control data.

According to another aspect of the present invention there is provided a video data storage and playback system, comprising: a playback device for playbacking digital video data; and a storage device for storing video data and reading stored video data and transmitting read out video data to the playback device in response to a request from the playback device; wherein the storage device transmits the read out video data to the playback device by attaching control data indicating that it is video data read out after an overtaking occurred, when the read out video data is video data stored after an occurrence of the overtaking in which a reading position of video data in a process of being read out from the storage device in response to the request from the playback device overtook a writing position of video data in a process of being written into the storage device; and the playback device resumes playback of video data that has been interrupted due to the occurrence of the overtaking, upon detecting the control data.

According to another aspect of the present invention there is provided a method for controlling a storage device for storing digital video data and reading stored video data and transmitting read out video data to a playback device for playbacking video data, in response to a request from the playback device, the method comprising the steps of: (a) controlling the storage device to carry out a video data reading and transmission processing in a mode specified from the playback device; and (b) controlling the storage device to interrupt video data reading and transmit an overtaking notice to the playback device, then read out video data written into the storage device after the overtaking notice, in an ordinary mode, and then transmit read out video data after an occurrence of an overtaking to the playback device by attaching control data having a prescribed value indicating that it is video data read out after the overtaking occurred, when the overtaking, in which a reading position of video data in a process of being read out from the storage device in response to the request from the playback device overtook a writing position of video data in a process of being written into the storage device, occurred during the video data reading and transmission processing of the step (a).

According to another aspect of the present invention there is provided a method for controlling a playback device for playbacking video data received from a storage device by making a request to a storage device storing digital video data, the method comprising the steps of: (a) controlling the playback device to carry out a video data playback processing in a mode specified from a user; and (b) controlling the playback device to interrupt video data playback after playbacking video data remaining in buffer memories of the storage device and the playback device upon receiving an overtaking notice from the storage device during the video data playback processing of the step (b), the overtaking notice indicating an occurrence of an overtaking in which a reading position of video data in a process of being read out from the storage device in response to the request from the playback device overtook a writing position of video data in a process of being written into the storage device, and then resume video data playback in an ordinary playback mode upon detecting receiving of video data read out after the occurrence of the overtaking from the storage device according to control data having a prescribed value indicating that it is video data read out after the overtaking occurred, which is attached to video data received from the storage device.

According to another aspect of the present invention there is provided an article of manufacture, comprising: a computer usable medium having computer readable program code means embodied therein for causing a computer to function as a controller of a storage device for storing digital video data and reading stored video data and transmitting read out video data to a playback device for playbacking video data, in response to a request from the playback device, the computer readable program code means includes: first computer readable program code means for causing said computer to control the storage device to carry out a video data reading and transmission processing in a mode specified from the playback device; and second computer readable program code means for causing said computer to control the storage device to interrupt video data reading and transmit an overtaking notice to the playback device, then read out video data written into the storage device after the overtaking notice, in an ordinary mode, and then transmit the read out video data after an occurrence of an overtaking to the playback device by attaching control data having a prescribed value indicating that it is video data read out after the overtaking occurred, when the overtaking, in which a reading position of video data in a process of being read out from the storage device in response to the request from the playback device overtook a writing position of video data in a process of being written into the storage device, occurred during the video data reading and transmission processing by the first computer readable program code means.

According to another aspect of the present invention there is provided an article of manufacture, comprising: a computer usable medium having computer readable program code means embodied therein for causing a computer to function as a controller of a playback device for playbacking video data received from a storage device by making a request to a storage device storing digital video data, the computer readable program code means includes: first computer readable program code means for causing said computer to control the playback device to carry out a video data playback processing in a mode specified from a user; and second computer readable program code means for causing said computer to control the playback device to interrupt video data playback after playbacking video data remaining in buffer memories of the storage device and the playback device upon receiving an overtaking notice from the storage device during the video data playback processing by the first computer readable program code means, the overtaking notice indicating an occurrence of an overtaking in which a reading position of video data in a process of being read out from the storage device in response to the request from the playback device overtook a writing position of video data in a process of being written into the storage device, and then resume video data playback in an ordinary playback mode upon detecting receiving of video data read out after the occurrence of the overtaking from the storage device according to control data having a prescribed value indicating that it is video data read out after the overtaking occurred, which is attached to video data received from the storage device.

According to another aspect of the present invention there is provided a storage device for storing digital video data and reading stored video data and transmitting read out video data to a playback device for playbacking video data, in response to a request from the playback device, the storage device comprising: a reading and transmission unit for carrying out a video data reading and transmission processing in a mode specified from the playback device; and an overtaking processing unit for interrupting video data reading and transmitting an overtaking notice to the playback device, then reading out video data written into the storage device after the overtaking notice, in an ordinary mode, and then transmitting read out video data after an occurrence of an overtaking to the playback device by attaching control data having a prescribed value indicating that it is video data read out after the overtaking occurred, when the overtaking, in which a reading position of video data in a process of being read out from the storage device in response to the request from the playback device overtook a writing position of video data in a process of being written into the storage device, occurred during the video data reading and transmission processing by the reading and transmission unit.

According to another aspect of the present invention there is provided a playback device for playbacking video data received from a storage device by making a request to a storage device storing digital video data, the playback device comprising: a playback processing unit for carrying out a video data playback processing in a mode specified from a user; and an overtaking processing unit for interrupting video data playback after playbacking video data remaining in buffer memories of the storage device and the playback device upon receiving an overtaking notice from the storage device during the video data playback processing of the playback processing unit, the overtaking notice indicating an occurrence of an overtaking in which a reading position of video data in a process of being read out from the storage device in response to the request from the playback device overtook a writing position of video data in a process of being written into the storage device, and then resuming video data playback in an ordinary playback mode upon detecting receiving of video data read out after the occurrence of the overtaking from the storage device according to control data having a prescribed value indicating that it is video data read out after the overtaking occurred, which is attached to video data received from the storage device.

Other features and advantages of the present invention will become apparent from the following description taken in conjunction with the accompanying drawings.

DETAILED DESCRIPTION OF THE PREFERRED EMBODIMENTS

Referring now to FIG. 1 to FIG. 4, one embodiment of the video data storage and playback system according to the present invention will be described in detail.

Figure 1:
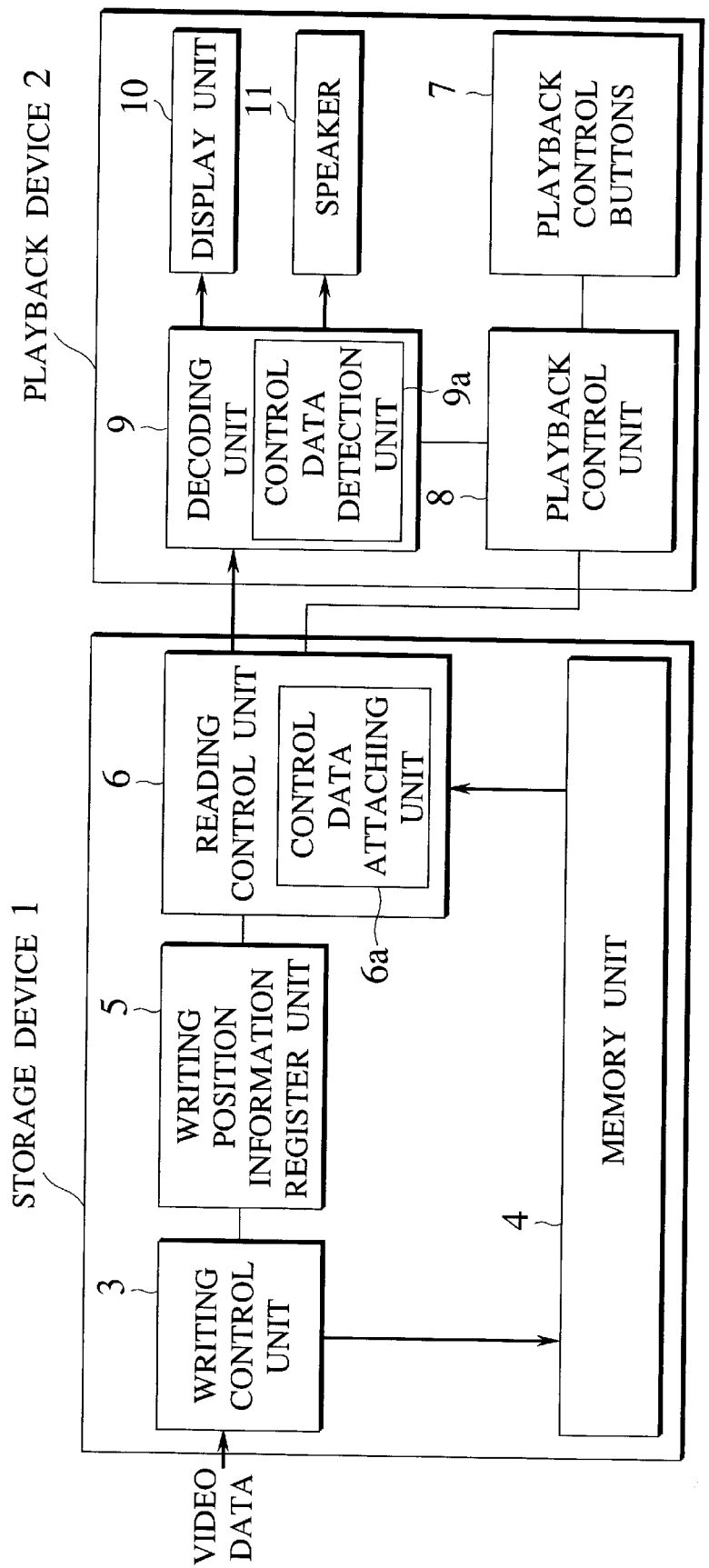
FIG. 1 is a block diagram showing a schematic configuration of a video data storage and playback system according to one embodiment of the present invention.

FIG. 1 shows a schematic configuration of a video data storage and playback system according to this embodiment. Note that, in FIG. 1, those elements which are substantially equivalent to the corresponding elements in FIG. 5 described above will be given the same reference numerals and their description will not be repeated here.

Figure 5:
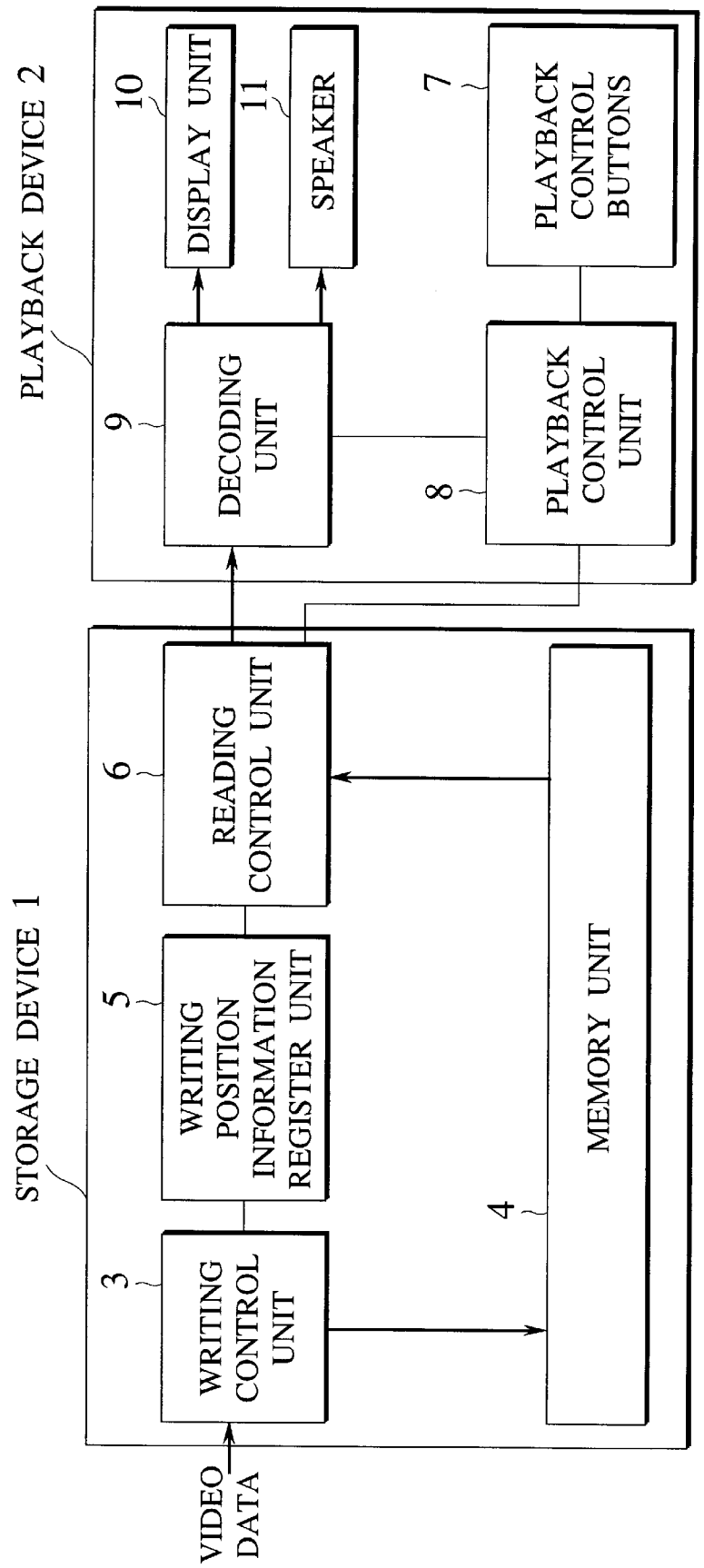
FIG. 5 is a block diagram showing a schematic configuration of a conventional video data storage and playback system.
Figure 6:
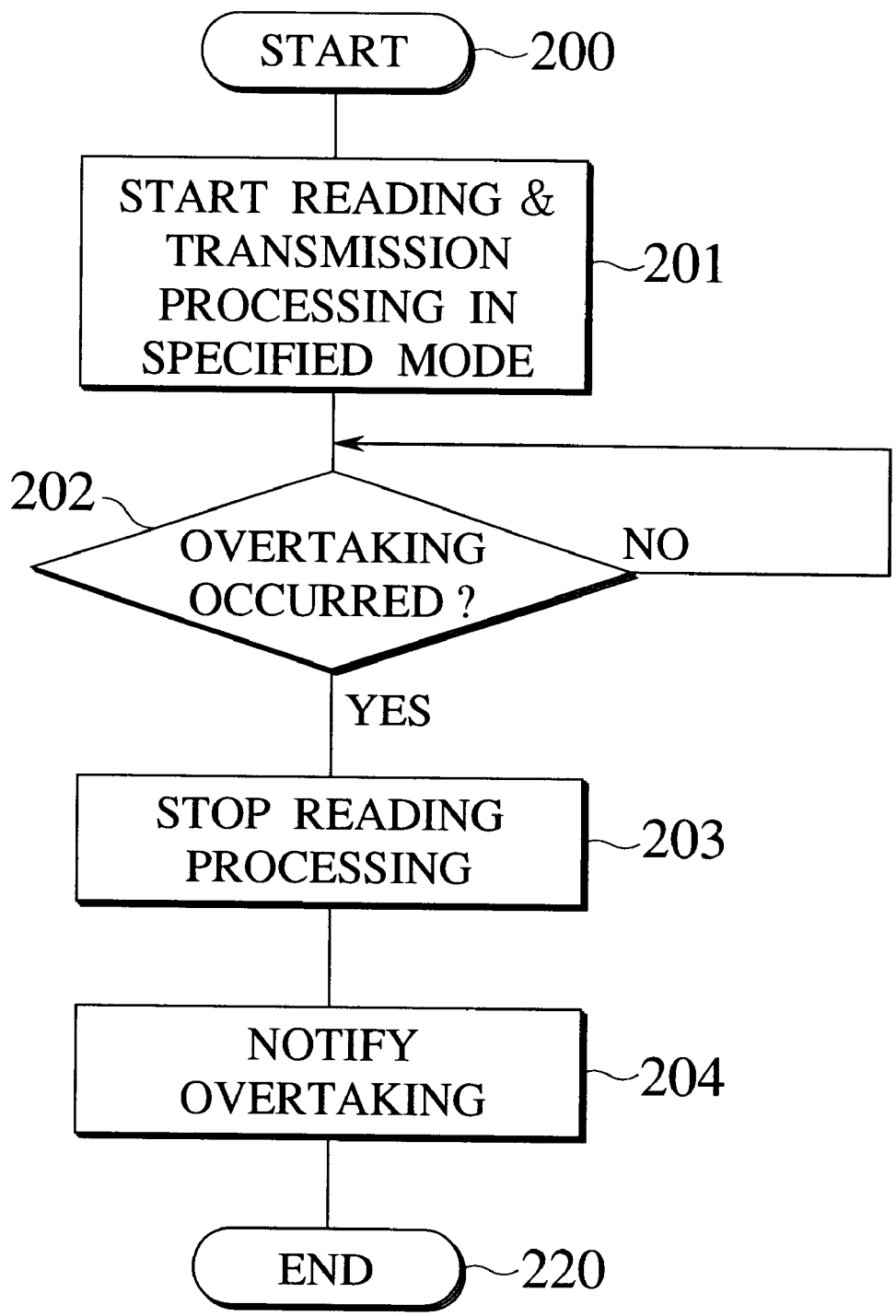
FIG. 6 is a flow chart for a processing procedure of a storage device in the video data storage and playback system of FIG. 5.
Figure 7:
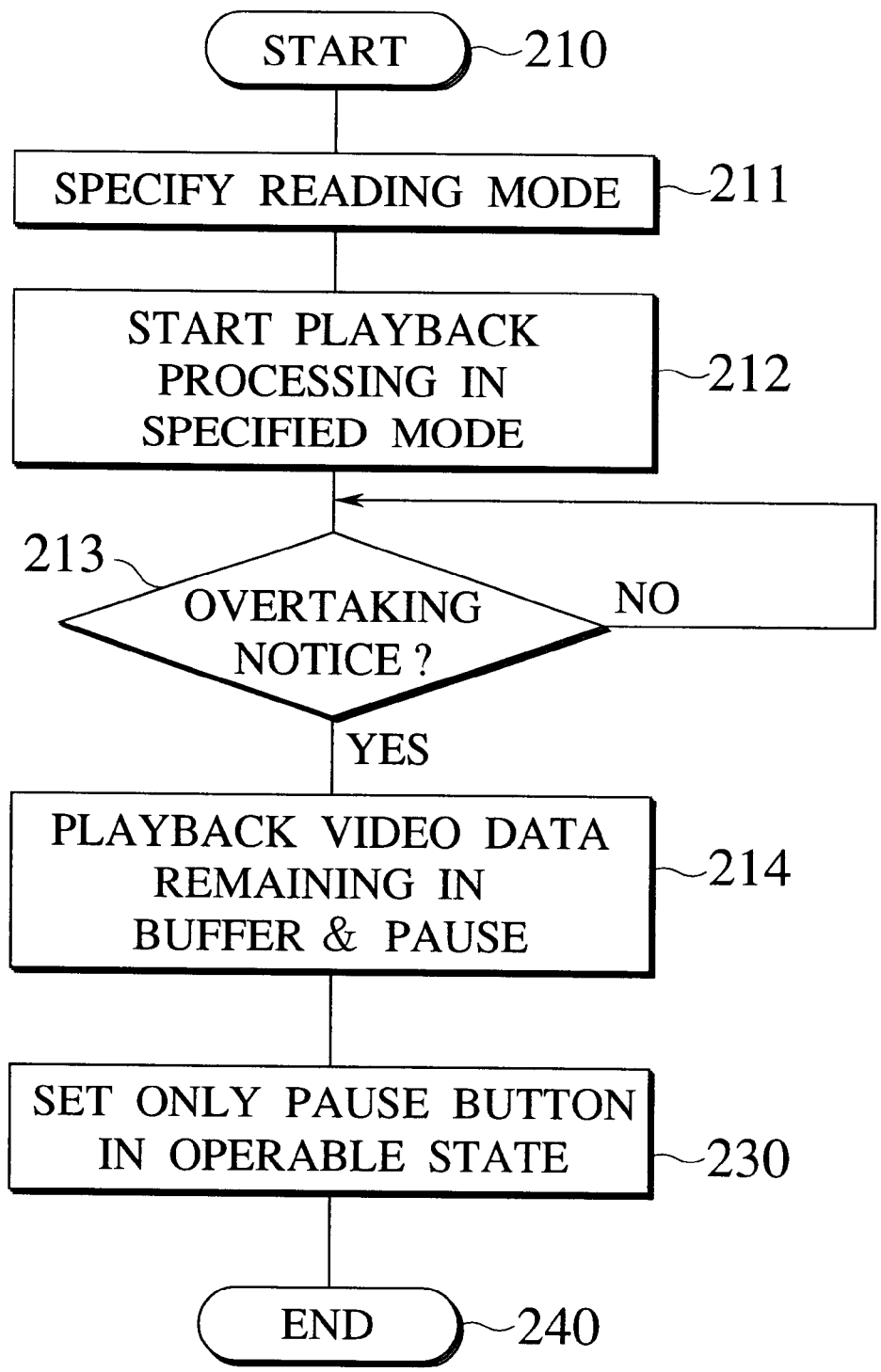
FIG. 7 is a flow chart for a processing procedure of a playback device in the video data storage and playback system of FIG. 5.

The video data storage and playback system of FIG. 1 differs from that of FIG. 5 in that the reading control unit 6 of the storage device 1 has a control data attaching unit 6a provided therein and the decoding unit 9 of the playback device 2 has a control data detection unit 9a provided therein.

When the storage device 1 of this embodiment is provided in a form of a video server, for example, the control data attaching unit 6a of the reading control unit 6 can be functionally realized by a control program.

Similarly, when the playback device 2 of this embodiment is provided in a form of a video-on-demand terminal, for example, the control data detection unit 9a of the decoding unit 9 can be functionally realized by a control program.

Figure 2:
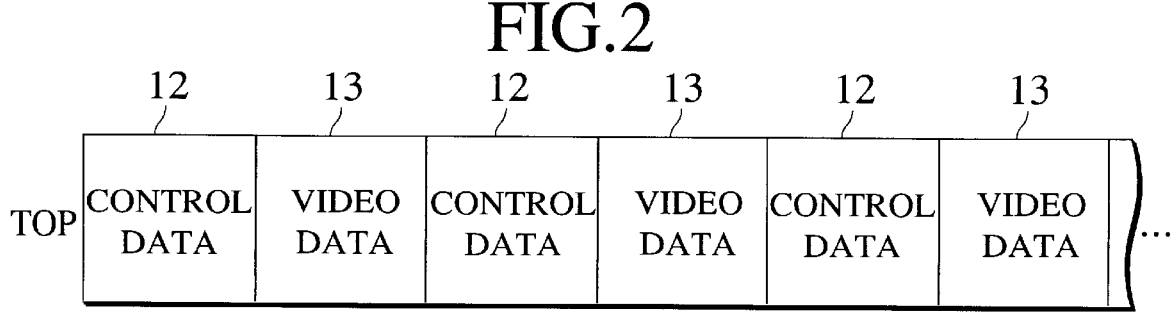
FIG. 2 is a diagram showing an exemplary data format of digital video data that can be used in the video data storage and playback system of FIG. 1.

FIG. 2 shows an exemplary data format of the digital video data transmitted to the storage device 1 from the external in the video data storage and playback system of FIG. 1.

As shown in FIG. 2, in this embodiment, a control data 12 which is set to a prescribed initial value in advance is periodically inserted between two adjacent video data 13. Here, the control data 12 and the video data 13 are set such that one control data 12 and one video data 13 that immediately follows that one control data 12 occupy an amount of data that is to be read out by one reading processing.

Now, a control method in the video data storage and playback system of FIG. 1 in the case where the playback chases after the video data under the writing processing will be described.

Figure 3:
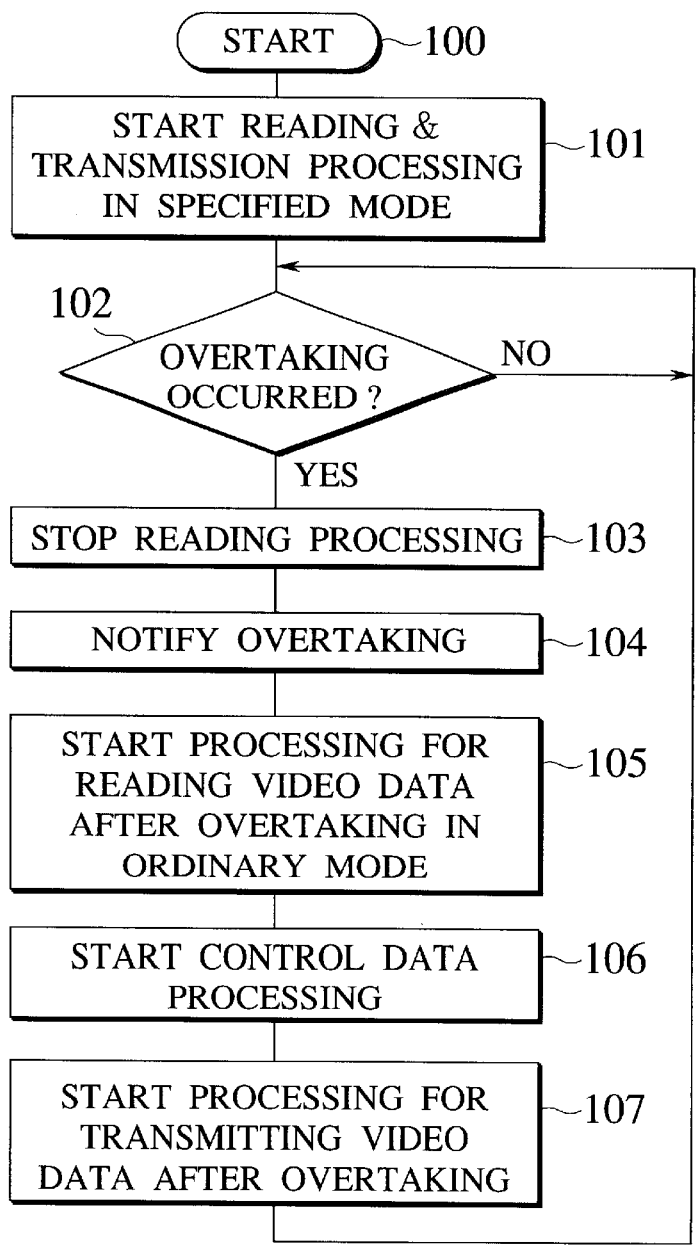
FIG. 3 is a flow chart for a processing procedure of a storage device in the video data storage and playback system of FIG. 1.
Figure 4:
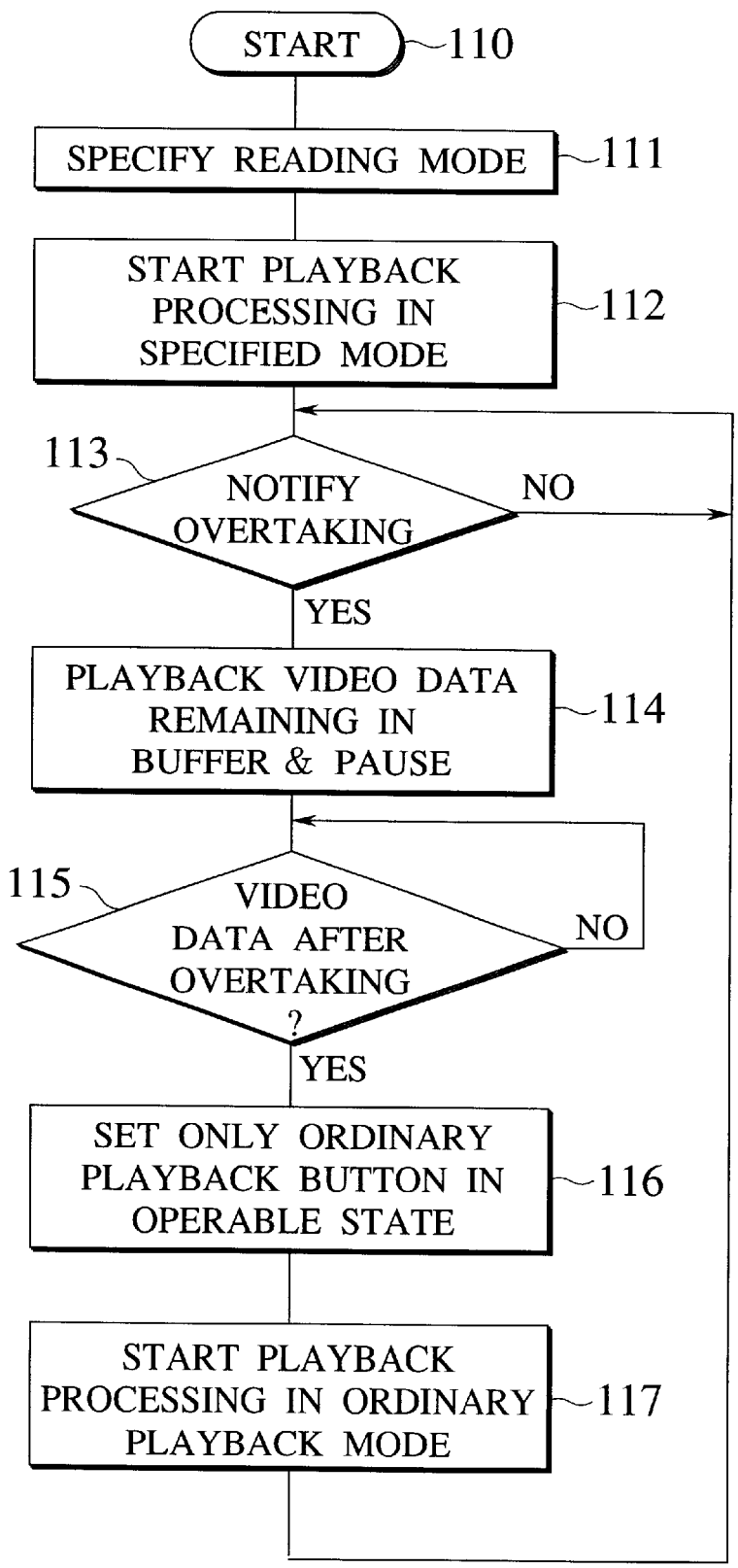
FIG. 4 is a flow chart for a processing procedure of a playback device in the video data storage and playback system of FIG. 1.

FIG. 3 shows a flow chart for the processing procedure by the storage device 1 of FIG. 1, while FIG. 4 shows a flow chart for the processing procedure by the playback device 2 of FIG. 1. In the processing procedure of the storage device 1 shown in FIG. 3, the step 100 to the step 104 are substantially the same as the step 200 to the step 204 of FIG. 5 described above so that their description will be omitted here. Also, in the processing procedure of the playback device 2 shown in FIG. 4, the step 110 to the step 114 are substantially the same as the step 210 to the step 214 of FIG. 5 described above so that their description will be omitted here.

In the processing procedure of FIG. 3, when the overtaking occurs at the storage device 1, after the overtaking notice is transmitted to the playback device 2 at the step 104, the reading control unit 6 of the storage device 1 starts the processing for reading the video data written into the memory unit 4 after this overtaking notice, in the ordinary mode (step 105).

In addition, the control data attaching unit 6a of the reading control unit 6 starts the control data processing for attaching the control data by adding a prescribed number other than zero (one, for example) to each control data 12 provided in the read out video data after the overtaking (step 106), and the reading control unit 6 starts the processing for transmitting the video data after the overtaking attached with the control data to the decoding unit 9 of the playback device 2 (step 107). The processing then returns to the step 102.

Also, in the processing procedure of FIG. 4, when the overtaking occurs at the storage device 1, after the playback control unit 8 of the playback device 2 controls the decoding unit 9 such that the decoding unit 9 playbacks the video data remaining in buffer memories within the reading control unit 6 and the decoding unit 9 and then pauses at the step 114, the decoding unit 9 starts checking whether the received video data is the video data read out after the occurrence of the overtaking or not (step 115).

Then, when the change in the control data is detected by the control data detection unit 9a, the decoding unit 9 notifies this to the playback control unit 8, in response to which the playback control unit 8 sets only an ordinary playback button among the playback control buttons 7 in an operable state (step 116).

In addition, the playback control unit 8 commands the start of the playback processing in the ordinary playback mode to the decoding unit 9 (step 117), and the processing returns to the step 113.

As described, according to the present invention, when the video data read out from the memory unit 4 of the storage device 1 and transmitted to the playback device 2 is the video data written into the memory unit 4 of the storage device 1 after the overtaking occurred at the storage device 1, that is, after the reading position of the video data in a process of being read out from the memory unit 4 of the storage device 1 in response to a request from the playback device 2 overtakes (catches up with) the writing position of the video data in a process of being written into the memory unit 4 of the storage device 1, the video data read out from the memory unit 4 of the storage device 1 is transmitted to the playback device 2 by attaching the control data Indicating that it is the video data read out after the occurrence of the overtaking. Then, the playback device 2 resumes the playback of the video data that has been interrupted due to the occurrence of the overtaking, upon detecting this control data, so that it becomes possible to playback the video data after the overtaking automatically in the ordinary playback mode at the playback device 2.

Moreover, according to the present invention, the control data is inserted periodically between the video data such that the control data and the video data are transmitted at the same time through the data lines. As a result, it becomes possible to carry out the processing after the overtaking occurrence with little delay, so that it becomes possible to realize the almost real time continuous video display.

It is to be noted that the above described embodiment is directed to the case where the control data 12 that is set to a prescribed initial value is periodically inserted between the video data in advance, but the present invention is not necessarily limited to this particular case alone, and it is also possible to provide the video data without any control data first, and then later attach the control data 12 starting from the video data read out immediately after the occurrence of the overtaking.

It is also to be noted that the above described embodiment according to the present invention may be conveniently implemented in forms of software programs for realizing the operations of the storage device and the playback device, as will be apparent to those skilled in the computer art. Appropriate software coding can readily be prepared by skilled programmers based on the teachings of the present disclosure, as will be apparent to those skilled in the software art.

In particular, a controller for controlling the storage device or a controller for controlling the playback device as described above can be conveniently implemented in a form of a software package. Such a software package can be provided in a form of a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A method for controlling a video data storage and playback system having a playback device for playbacking digital video data and a storage device for storing video data and reading stored video data and transmitting read out video data to the playback device in response to a request from the playback device, the method comprising the steps of:

(a) controlling the storage device to transmit the read out video data to the playback device and attaching control data indicating that it is video data read out after an overtaking occurred, when the read out video data is video data stored after an occurrence of the overtaking in which a reading position of video data in a process of being read out from the storage device in response to the request from the playback device overtook a writing position of video data in a process of being written into the storage device; and (b) controlling the playback device to resume playback of video data that has been interrupted due to the occurrence of the overtaking, upon detecting the control data.

2. The method of claim 1, wherein at the step (a), the storage device is controlled to transmit the read out video data in which the control data is periodically inserted among video data, to the playback device.

3. The method of claim 1, wherein at the step (a), when the overtaking occurred, the storage device is controlled to interrupt video data reading and transmit an overtaking notice to the playback device, then read out video data written into the storage device after the overtaking notice, in an ordinary mode, and then transmit the read out video data after the occurrence of the overtaking to the playback device by attaching the control data having a prescribed value.

4. The method of claim 1, wherein at the step (b), the playback device is controlled to interrupt video data playback after playbacking video data remaining in buffer memories of the storage device and the playback device upon receiving an overtaking notice from the storage device, and then resume video data playback in an ordinary playback mode upon detecting receiving of video data read out after the occurrence of the overtaking from the storage device according to the control data.

5. A video data storage and playback system, comprising:

a playback device for playbacking digital video data; and a storage device for storing video data and reading stored video data and transmitting read out video data to the playback device in response to a request from the playback device;

wherein the storage device transmits the read out video data to the playback device and attaching control data indicating that it is video data read out after an overtaking occurred, when the read out video data is video data stored after an occurrence of the overtaking in which a reading position of video data in a process of being read out from the storage device in response to the request from the playback device overtook a writing position of video data in a process of being written into the storage device; and the playback device resumes playback of video data that has been interrupted due to the occurrence of the overtaking, upon detecting the control data.

6. The system of claim 5, wherein the storage device transmits the read out video data in which the control data is periodically inserted among video data, to the playback device.

7. The system of claim 5, wherein when the overtaking occurred, the storage device interrupts video data reading and transmits an overtaking notice to the playback device, then reads out video data written into the storage device after the overtaking notice, in an ordinary mode, and then transmits the read out video data after the occurrence of the overtaking to the playback device by attaching the control data having a prescribed value.

8. The system of claim 5, wherein the playback device interrupts video data playback after playbacking video data remaining in buffer memories of the storage device and the playback device upon receiving an overtaking notice from the storage device, and then resumes video data playback in an ordinary playback mode upon detecting receiving of video data read out after the occurrence of the overtaking from the storage device according to the control data.

9. The system of claim 5, wherein the storage device includes a memory unit for storing video data, a writing control unit for writing video data supplied from an external into the memory unit, and a reading control unit for reading video data from the memory unit and transmitting the read out video data to the playback device in response to the request from the playback device, where the reading control unit has a control data attaching mechanism for attaching the control data indicating that it is video data read out after the overtaking occurred, to video data read out from the memory unit, when the read out video data is video data stored after the occurrence of the overtaking.

10. The system of claim 5, wherein the playback device includes a playback control unit for requesting video data reading to the storage device and controlling playback of video data transmitted from the storage device, and a decoding unit for decoding video data transmitted from the storage device, where the decoding unit has a control data detection mechanism for detecting the control data and the playback control unit commands resuming of video data playback that has been interrupted due to the occurrence of the overtaking when the control data is detected by the control data detection mechanism of the decoding unit.

11. A method for controlling a storage device for storing digital video data and reading stored video data and transmitting read out video data to a playback device for playbacking video data, in response to a request from the playback device, the method comprising the steps of:

(a) controlling the storage device to carry out a video data reading and transmission processing in a mode specified from the playback device; and (b) controlling the storage device to interrupt video data reading and transmit an overtaking notice to the playback device, then read out video data written into the storage device after the overtaking notice, in an ordinary mode, and then transmit read out video data after an occurrence of an overtaking to the playback device and attaching control data having a prescribed value indicating that it is video data read out after the overtaking occurred, when the overtaking, in which a reading position of video data in a process of being read out from the storage device in response to the request from the playback device overtook a writing position of video data in a process of being written into the storage device, occurred during the video data reading and transmission processing of the step (a).

12. A method for controlling a playback device for playbacking video data received from a storage device by making a request to the storage device storing digital video data, the method comprising the steps of:

(a) controlling the playback device to carry out a video data playback processing in a mode specified from a user; and (b) controlling the playback device to interrupt video data playback after playbacking video data remaining in buffer memories of the storage device and the playback device upon receiving an overtaking notice from the storage device during the video data playback processing of the step (a), the overtaking notice indicating an occurrence of an overtaking in which a reading position of video data in a process of being read out from the storage device in response to the request from the playback device overtook a writing position of video data in a process of being written into the storage device, and then resume video data playback in an ordinary playback mode upon detecting receiving of video data read out after the occurrence of the overtaking from the storage device according to control data having a prescribed value indicating that it is video data read out after the overtaking occurred, which is attached to video data received from the storage device.

13. An article of manufacture, comprising:

a computer usable medium having computer readable program code means embodied therein for causing a computer to function as a controller of a storage device for storing digital video data and reading stored video data and transmitting read out video data to a playback device for playbacking video data, in response to a request from the playback device, the computer readable program code means includes:

first computer readable program code means for causing said computer to control the storage device to carry out a video data reading and transmission processing in a mode specified from the playback device; and second computer readable program code means for causing said computer to control the storage device to interrupt video data reading and transmit an overtaking notice to the playback device, then read out video data written into the storage device after the overtaking notice, in an ordinary mode, and then transmit the read out video data after an occurrence of an overtaking to the playback device by attaching control data having a prescribed value indicating that it is video data read out after the overtaking occurred, when the overtaking, in which a reading position of video data in a process of being read out from the storage device in response to the request from the playback device overtook a writing position of video data in a process of being written into the storage device, occurred during the video data reading and transmission processing by the first computer readable program code means.

14. An article of manufacture, comprising:

a computer usable medium having computer readable program code means embodied therein for causing a computer to function as a controller of a playback device for playbacking video data received from a storage device by making a request to the storage device storing digital video data, the computer readable program code means includes:

first computer readable program code means for causing said computer to control the playback device to carry out a video data playback processing in a mode specified from a user; and second computer readable program code means for causing said computer to control the playback device to interrupt video data playback after playbacking video data remaining in buffer memories of the storage device and the playback device upon receiving an overtaking notice from the storage device during the video data playback processing by the first computer readable program code means, the overtaking notice indicating an occurrence of an overtaking in which a reading position of video data in a process of being read out from the storage device in response to the request from the playback device overtook a writing position of video data in a process of being written into the storage device, and then resume video data playback in an ordinary playback mode upon detecting receiving of video data read out after the occurrence of the overtaking from the storage device according to control data having a prescribed value indicating that it is video data read out after the overtaking occurred, which is attached to video data received from the storage device.

15. A storage device for storing digital video data and reading stored video data and transmitting read out video data to a playback device for playbacking video data, in response to a request from the playback device, the storage device comprising:

a reading and transmission unit for carrying out a video data reading and transmission processing in a mode specified from the playback device; and an overtaking processing unit for interrupting video data reading and transmitting an overtaking notice to the playback device, then reading out video data written into the storage device after the overtaking notice, in an ordinary mode, and then transmitting read out video data after an occurrence of an overtaking to the playback device by attaching control data having a prescribed value indicating that it is video data read out after the overtaking occurred, when the overtaking, in which a reading position of video data in a process of being read out from the storage device in response to the request from the playback device overtook a writing position of video data in a process of being written into the storage device, occurred during the video data reading and transmission processing by the reading and transmission unit.

16. A playback device for playbacking video data received from a storage device by making a request to the storage device storing digital video data, the playback device comprising:

a playback processing unit for carrying out a video data playback processing in a mode specified from a user; and an overtaking processing unit for interrupting video data playback after playbacking video data remaining in buffer memories of the storage device and the playback device upon receiving an overtaking notice from the storage device during the video data playback processing of the playback processing unit, the overtaking notice indicating an occurrence of an overtaking in which a reading position of video data in a process of being read out from the storage device in response to the request from the playback device overtook a writing position of video data in a process of being written into the storage device, and then resuming video data playback in an ordinary playback mode upon detecting receiving of video data read out after the occurrence of the overtaking from the storage device according to control data having a prescribed value indicating that it is video data read out after the overtaking occurred, which is attached to video data received from the storage device.

* * * * *